United States Patent
Lin et al.

(10) Patent No.: US 12,008,194 B2
(45) Date of Patent: Jun. 11, 2024

(54) TOUCH DISPLAY DEVICE AND DRIVING METHOD WITH LINE FOR TRANSMITTING TOUCH SIGNAL AND COMMON ELECTRODE SIGNAL AT DIFFERENT STAGES

(71) Applicant: AUO Corporation, Hsin-Chu (TW)

(72) Inventors: Che-Min Lin, Hsin-Chu (TW);
Chun-Ru Huang, Hsin-Chu (TW);
Chu-Kuan Yu, Hsin-Chu (TW);
Fang-Ming Tsao, Hsin-Chu (TW);
Kai-Teng Chiang, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/070,982

(22) Filed: Nov. 29, 2022

(65) Prior Publication Data

US 2023/0350517 A1    Nov. 2, 2023

(30) Foreign Application Priority Data

Apr. 27, 2022   (TW) .................................. 111116069

(51) Int. Cl.
*G06F 3/041*      (2006.01)
*G06F 3/044*      (2006.01)

(52) U.S. Cl.
CPC ........ *G06F 3/04164* (2019.05); *G06F 3/0412* (2013.01); *G06F 3/0445* (2019.05); *G06F 3/0446* (2019.05)

(58) Field of Classification Search
CPC .. G06F 3/04164; G06F 3/0412; G06F 3/0445; G06F 3/0446; G06F 3/04184
See application file for complete search history.

(56) References Cited

U.S. PATENT DOCUMENTS

| 2013/0031436 | A1 | 1/2013 | Mizutani |
| 2013/0314361 | A1 | 11/2013 | Saitoh |
| 2017/0153752 | A1* | 6/2017 | Kurasawa ......... G02F 1/133512 |
| 2021/0216164 | A1* | 7/2021 | Bao ........................ G06F 3/0412 |

(Continued)

FOREIGN PATENT DOCUMENTS

| CN | 103049130 A | 4/2013 |
| EP | 2330491 A2 | 6/2011 |

(Continued)

*Primary Examiner* — Liliana Cerullo
(74) *Attorney, Agent, or Firm* — WPAT, P.C

(57) ABSTRACT

Touch display device includes a first touch electrode, a second touch electrode, and a first touch signal line. First touch electrode is located in a first area of touch display device and is configured to receive a first control signal to generate a first touch signal. Second touch electrode is located in a second area of touch display device and is configured to receive a second control signal to generate a second touch signal. First area is adjacent to second area without overlapping. First touch signal line is coupled to first touch electrode and second touch electrode. First touch signal line is configured to transmit first touch signal of first area at a first stage. First touch signal line is configured to transmit a common electrode signal at a second stage. First touch signal line is configured to transmit second touch signal of second area at a third stage.

16 Claims, 8 Drawing Sheets

(56) References Cited

U.S. PATENT DOCUMENTS

| 2023/0097132 A1* | 3/2023 | Yu ......................... G06F 3/0443 |
| | | 345/173 |
| 2023/0134476 A1* | 5/2023 | Jung ................... G06F 3/04166 |
| | | 345/173 |

FOREIGN PATENT DOCUMENTS

| TW | I677812 B | 11/2019 |
| TW | 202028937 A | 8/2020 |

\* cited by examiner

300

┌─────────────────────────────────────────────┐
│ a first touch signal of the first touch electrode of the │
│ first area is transmitted by the first touch signal line │ ～310
│ at a first stage │
└─────────────────────────────────────────────┘
                        ↓
┌─────────────────────────────────────────────┐
│ a common electrode signal is transmitted by the first │ ～320
│ touch signal line at a second stage │
└─────────────────────────────────────────────┘
                        ↓
┌─────────────────────────────────────────────┐
│ a second touch signal of the second touch electrode of │
│ the second area is transmitted by the first touch signal │ ～330
│ line at a third stage │
└─────────────────────────────────────────────┘

Fig. 4

TOUCH DISPLAY DEVICE AND DRIVING METHOD WITH LINE FOR TRANSMITTING TOUCH SIGNAL AND COMMON ELECTRODE SIGNAL AT DIFFERENT STAGES

CROSS-REFERENCE TO RELATED APPLICATION

This application claims priority to Taiwan Application Serial Number 111116069, filed on Apr. 27, 2022, which is herein incorporated by reference in its entirety.

BACKGROUND

Field of Invention

The present disclosure relates to an electronic device and a method. More particularly, the present disclosure relates to a touch display device and a driving method.

Description of Related Art

A resolution of conventional touch display device is divided into Full High Definition (FHD) of high-Definition resolution, Quarter High Definition (QHD) of 2K resolution, and Ultra High Definition (UHD) of 4K resolution or higher according to different sizes of conventional touch display device.

When a resolution of a touch display device is increased from FHD to UHD, a number of touch electrodes needs to increase so that a number of touch lines of a touch display device also need to increase. Therefore, bonding such a large number of touch lines increases a risk of bonding failure.

For the foregoing reason, there is a need to provide a design of touch lines of a touch display device to solve the problems of the prior art.

SUMMARY

One aspect of the present disclosure provides a touch display device. The touch display device includes a first touch electrode, a second touch electrode, and a first touch signal line. The first touch electrode is located in a first area of the touch display device, and is configured to receive a first control signal so as to generate a first touch signal. The second touch electrode is located in a second area of the touch display device, and is configured to receive a second control signal so as to generate a second touch signal. The first area is adjacent to the second area without overlapping. The first touch signal line is coupled to the first touch electrode and the second touch electrode. The first touch signal line is configured to transmit the first touch signal of the first area at a first stage. The first touch signal line is configured to transmit a common electrode signal at a second stage. The first touch signal line is configured to transmit the second touch signal of the second area at a third stage.

Another aspect of the present disclosure provides a driving method. The driving method is adapted for a touch display device. The touch display device includes a first touch electrode, a second touch electrode, and a first touch signal line. The first touch electrode is located in a first area of the touch display device. The second touch electrode is located in a second area of the touch display device. The first area is adjacent to the second area without overlapping. The first touch signal line is coupled to the first touch electrode and the second touch electrode. The driving method includes following steps: transmitting a first touch signal of the first touch electrode of the first area by the first touch signal line at a first stage; transmitting a common electrode signal by the first touch signal line at a second stage; and transmitting a second touch signal of the second touch electrode of the second area by the first touch signal line at a third stage.

BRIEF DESCRIPTION OF THE DRAWINGS

The present disclosure can be more fully understood by reading the following detailed description of the embodiment, with reference made to the accompanying drawings as follows:

FIG. 4 depicts a flow diagram of a driving method according to some embodiments of the present disclosure;

DETAILED DESCRIPTION

Figure 1:
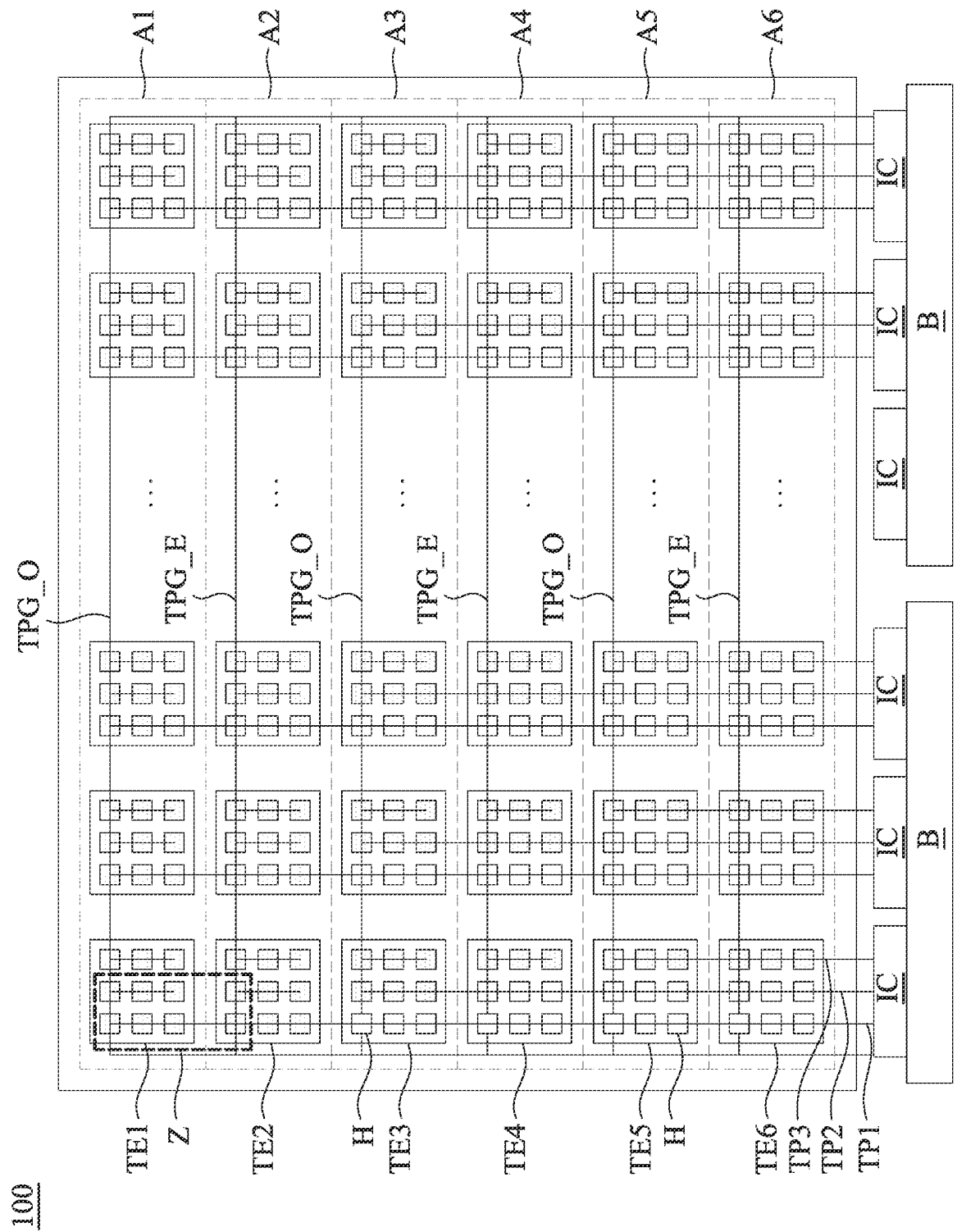
FIG. 1 depicts a schematic diagram of a touch display device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a touch display device 100 according to some embodiments of the present disclosure. In some embodiments, please refer to FIG. 1, the touch display device 100 includes a first touch electrode TE1, a second touch electrode TE2, and a first touch signal line TP1. The first touch electrode TE1 is located in a first area A1 of the touch display device 100, and is configured to receive a first control signal so as to generate first touch signal. The second touch electrode TE2 is located in a second area A2 of the touch display device 100, and is configured to receive a second control signal so as to generate a second touch signal. The first area A1 is adjacent to the second area A2 without overlapping.

Then, please refer to the far left side of FIG. 1, the first touch signal line TP1 is coupled to the first touch electrode TE1 and the second touch electrode TE2. The first touch signal line TP1 is configured to transmit the first touch signal of the first area A1 at a first stage. The first touch signal line TP1 is configured to transmit a common electrode signal at a second stage. The first touch signal line TP1 is configured to transmit the second touch signal of the second area A2 at a third stage.

In some embodiments, the touch display device 100 further includes a first control line TPG_O and a second control line TPG_E. The first control line TPG_O is coupled to the first touch electrode TE1, and is configured to transmit the first control signal. The second control line TPG_E is coupled to the second touch electrode TE2, and is configured to transmit the second control signal.

In some embodiments, the touch display device 100 further includes a second touch signal line TP2, a third touch electrode TE3, and a fourth touch electrode TE4. The third touch electrode TE3 is located in a third area A3 of the touch display device 100. The second touch signal line TP2 is coupled to the third touch electrode TE3 and the fourth touch electrode TE4. The third touch electrode TE3 includes at least one hole of H (shown as white in the figure). The first touch signal line TP1 passes through the at least one hole H of the third touch electrode TE3.

Then, please refer to the far left side of FIG. 1, the fourth touch electrode TE4 is located in a fourth area A4 of the touch display device 100. The fourth touch electrode TE4 also includes holes such as the third touch electrode TE3. The first touch signal line TP1 also passes through holes of the fourth touch electrode TE4.

In addition, the first touch signal line TP1 and the second touch signal line TP2 are parallel to each other.

In some embodiments, the touch display device 100 further includes a third touch signal line TP3, a fifth touch electrode TE5, and a sixth touch electrode TE6. The fifth touch electrode TE5 is located in a fifth area A5 of the touch display device 100. The sixth touch electrode TE6 is located in a sixth area A6 of the touch display device 100. The third touch signal line TP3 is coupled to the fifth touch electrode TE5 and the sixth touch electrode TE6.

Then, the fifth touch electrode TE5 and the sixth touch electrode TE6 include holes such as the third touch electrode TP3 and the fourth touch electrode TP4 (shown as white in the figure). The holes of the fifth touch electrode TE5 and the sixth touch electrode TE6 allow the first touch signal line TP1 and the second touch signal line TP2 to pass through respectively.

In some embodiments, the first control line TPG_O is coupled to the first touch electrode TE1, the third touch electrode TE3, and the fifth touch electrode TE5. In other words, the first control line TPG_O is coupled to touch electrodes in odd-numbered areas (e.g., the first area A1, the third area A3, and the fifth area A5).

In some embodiments, the second control line TPG_E is coupled to second touch electrode TE2, the fourth touch electrode TE4, and the sixth touch electrode TE6. In other words, the second control line TPG_E is coupled to touch electrodes in even-numbered areas (e.g., the second area A2, the fourth area A4, and the sixth area A6).

It should be noted that areas of the embodiments in FIG. 1 all illustrate the touch electrodes of a single column in the areas (e.g., the first area A1 to the sixth area A6). In some embodiments, the first area A1 to the sixth area A6 includes a plurality of columns of touch electrodes.

In some embodiments, please refer to the far left side of FIG. 1, the first control line TPG_O, the second control line TPG_E, the first touch signal line TP1, the second touch signal line TP2, and the third touch signal line TP3 are coupled to a plurality of integrated circuits IC of the touch display device 100.

In some embodiments, the plurality of integrated circuits IC are disposed on a base B.

Figure 2:
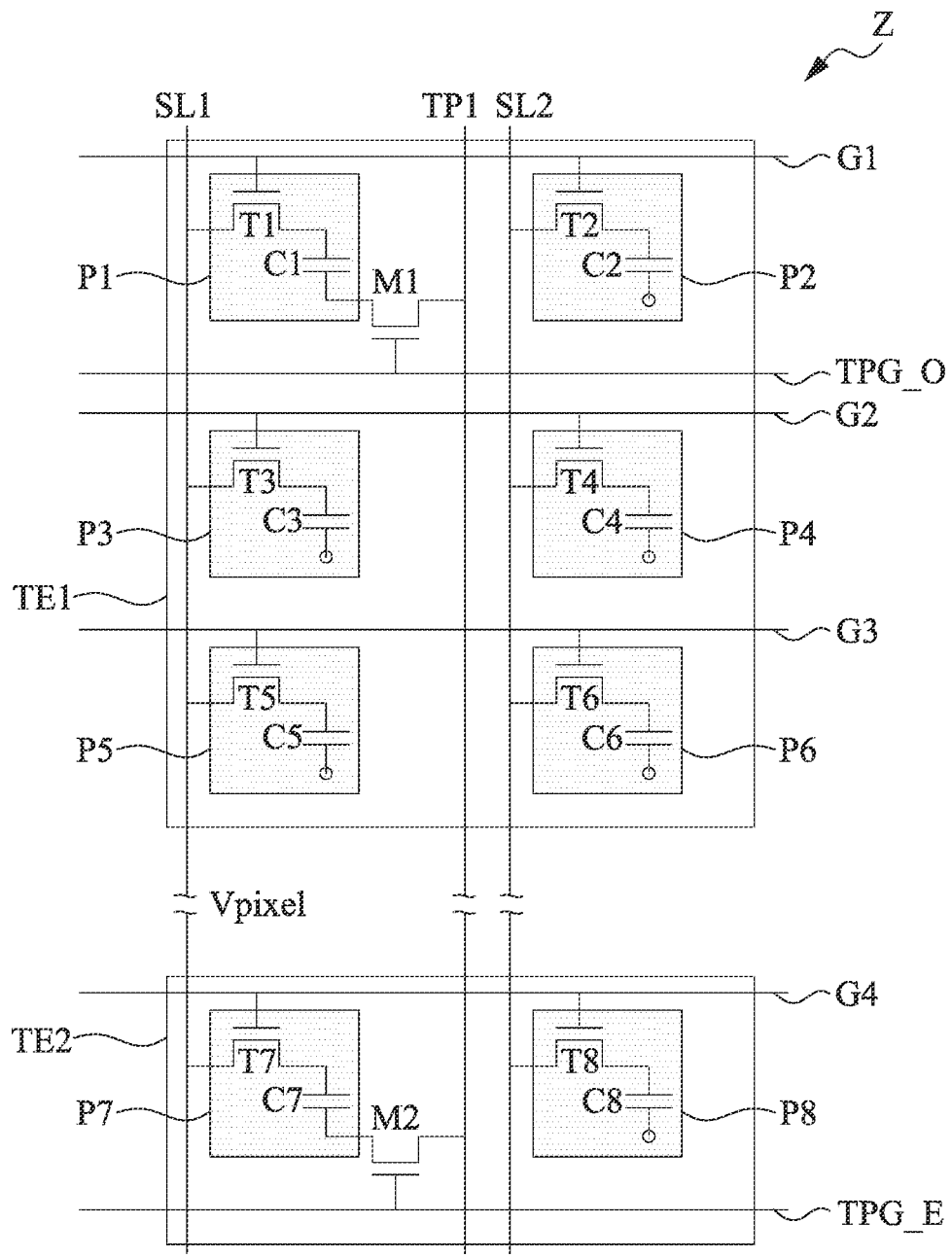
FIG. 2 depicts a schematic diagram of part of the touch electrodes of a touch display device according to some embodiments of the present disclosure.

FIG. 2 depicts a schematic diagram of part of the touch electrodes in a partial area Z of the touch display device 100 shown in FIG. 1 according to some embodiments of the present disclosure. In some embodiments, please refer to FIG. 2, the partial area Z of the touch display device 100 includes a first touch electrode TE1, a second touch electrode TE2, a plurality of data lines (e.g., the first data line SL1 and the second data line SL2) and a plurality of gate lines (e.g., a first gate line G1 for a first gate signal to a fourth gate line G4 for a fourth gate signal).

In some embodiments, please refer to FIG. 1 and FIG. 2, the first touch electrode TE1 includes a plurality of first pixel circuits (e.g., a pixel circuit P1 to a pixel circuit P6) and a first touch transistor M1. It should be noted that the pixel circuit P1 to pixel circuit P6 are shown as a plurality of black dots as shown in FIG. 1. The first touch electrode TE1 and a plurality of first pixel circuits (e.g., the pixel circuit P1 to the pixel circuit P6) are located in different layers.

Then, the pixel circuit P1, a pixel circuit P3, and a pixel circuit P5 are coupled to the first data line SL1. A pixel circuit P2, a pixel circuit P4, and the pixel circuit P6 are coupled to the second data line SL2.

In addition, the pixel circuit P1 and the pixel circuit P2 are coupled to the first gate line G1 (for transmitting the first gate signal). The pixel circuit P3 and the pixel circuit P4 are coupled to a second gate line G2 (for transmitting a second gate signal). The pixel circuit P5 and the pixel circuit P6 are coupled to a third gate line G3 (for transmitting a third gate signal).

In some embodiments, each of the plurality of first pixel circuits (the pixel circuit P1 to the pixel circuit P6) includes a transistor and a capacitor. For example, the pixel circuit P1 includes a transistor T1 and a capacitor C1. Detail circuit structure of each of the pixel circuit P2 to the pixel circuit P6 is the same as detail circuit structure of the pixel circuit T1, and repetitious details are omitted herein.

In some embodiments, each of the plurality of first pixel circuits (e.g., the pixel circuit P1 to the pixel circuit P6) is configured to drive according to a gat signal of a plurality of gate lines so as to display respectively. In detail, the pixel circuit P1 and the pixel circuit P2 are the same row. The pixel circuit P3 and the pixel circuit P4 are the same row. The pixel circuit P5 and the pixel circuit P6 are the same row. The touch display device 100 will scan sequentially from a top row to a bottom row, and its circuit operation will be described in detail in e following paragraphs.

In some embodiments, please refer to FIG. 2, and start form a top end and a right end of each of an element shown in the figure as a first end, the first touch transistor M1 includes a first end, a second end, and a control end.

The first end of the first touch transistor M1 is coupled to the first touch signal line TP1. The second end of the first touch transistor M1 is coupled to one of a plurality of first pixel circuits (e.g., the pixel circuit P1). The control end of the first touch transistor M1 is coupled to the first control line TPG_O (for transmitting the first control signal).

Then, the first touch transistor M1 is coupled to one of the plurality of first pixel circuit (e.g., the capacitor C1 of the pixel circuit P1).

It should be noted that a location of the first touch transistor M1 is not limited to embodiments shown in the figure, and can be designed according to actual needs. The first touch transistor M1 can be coupled to any one of the plurality of pixel circuits (e.g., the pixel circuit P1 to the pixel circuit P6) of the first touch electrode TE1.

It is further described that a number of the first touch transistor M1 is not limited to embodiments shown in the figure, and can be designed according to actual needs. In other words, if a number of the first touch transistor M1 is increase and disposed in the pixel circuit P3 and the pixel circuit P5 respectively, a number of the first gate line G1 (for transmitting the first gate signal) should increase corresponding to the number of the first touch transistor M1.

In some embodiments, please refer to FIG. 1 and FIG. 2, the second touch electrode TE2 includes a plurality of second pixel circuits (e.g., a pixel circuit P7 to a pixel circuit P8) and a second touch transistor M2. The second touch electrode TE1 and a plurality of second pixel circuits (e.g., the pixel circuit P7 to the pixel circuit P8) are located in different layers.

Then, the pixel circuit P7 is coupled to the first data line SL1. The pixel circuit P8 is coupled to the second data line SL2.

In addition, the pixel circuit P7 and the pixel circuit P8 are coupled to the fourth gate line G4 (for transmitting the fourth gate signal).

In some embodiments, each of the plurality of second pixel circuits (e.g., the pixel circuit P7 and the pixel circuit P8) includes a transistor and a capacitor. For example, pixel circuit P7 includes a transistor T7 and a capacitor C7. Detail circuit structure of the pixel circuit P8 is the same as detail circuit structure of the pixel circuit pixel circuit P7, and repetitious details are omitted herein.

In some embodiments, the plurality of second pixel circuits (e.g., the pixel circuit P7 and the pixel circuit P8) is configured to drive according to the fourth gate signal of the fourth gate line G4.

In some embodiments, please refer to FIG. 2, and start form a top end and a right end of each of an element shown in the figure as a first end, the second touch transistor M2 includes a first end, a second end, and a control end.

The first end of the second touch transistor M2 is coupled to the first touch signal line TP1. The second end of the second touch transistor M2 is coupled to one of the plurality of second pixel circuits (e.g., the pixel circuit P7). The control end of the second touch transistor M2 is coupled to the second control line TPG_E (for transmitting the second control signal).

Then, the second touch transistor M2 is coupled to one of the plurality of second pixel circuits (e.g., a capacitor C7 of the pixel circuit P7).

It should be noted that a location of the second touch transistor M2 is not limited to embodiments shown in the figure, and can be designed according to actual needs. The second touch transistor M2 can be coupled to any one of the plurality of pixel circuits (e.g., the pixel circuit P7 and the pixel circuit P8) of second touch electrode TE2.

In some embodiments, please refer to FIG. 1 and FIG. 2, a number of the first touch electrode TE1 to the sixth touch electrode TE6 of the plurality of pixel circuits may be 360, and is not limited to embodiments of the figure.

In some embodiments, when the first touch electrode TE1 to the sixth touch electrode TE6 are configured to sense a touch capacitance of user's fingers touch, a size of the first touch electrode TE1 to the sixth touch electrode TE6 is 5 mm to 6 mm.

In some embodiments, when the first touch electrode TE1 to the sixth touch electrode TE6 are configured to sense a touch capacitance of a stylus, a size of the first touch electrode TE1 to the sixth touch electrode TE6 is 4 mm.

It is worth noting that, please refer to FIG. 2, the first touch transistor M1 of the first touch electrode TE1 and the second touch transistor M2 of the second touch electrode TE2 are coupled to the same first touch signal line TP1.

In some embodiments, the first touch signal line TP1 does not cross a plurality of data lines (e.g., the first data line SL1 and the second data line SL2). In other words, the plurality of data lines (e.g., the first data line SL1 and the second data line SL2) and the first touch signal line TP1 are parallel to each other. Therefore, the first touch transistor M1 and the second touch transistor M2 must be on the same row or on the same column.

In some embodiments, please refer to FIG. 2, the first touch signal line TP1 and the first control line TPG_O (for transmitting the first control signal) overlap in a vertical projection direction. The first touch signal line TP1 and the second control line TPG_E (for transmitting the second control signal) overlap in the vertical projection direction.

In some embodiments, please refer to FIG. 2, the first control line TPG_O (for transmitting the first control signal), the second control line TPG_E (for transmitting the second control signal), the first gate line G1 (for transmitting the first gate signal), the second gate line G2 (for transmitting the second gate signal), the third gate line G3 (for transmitting the third gate signal), and the fourth gate line G4 (for transmitting the fourth gate signal) are parallel to each other.

Figure 3:
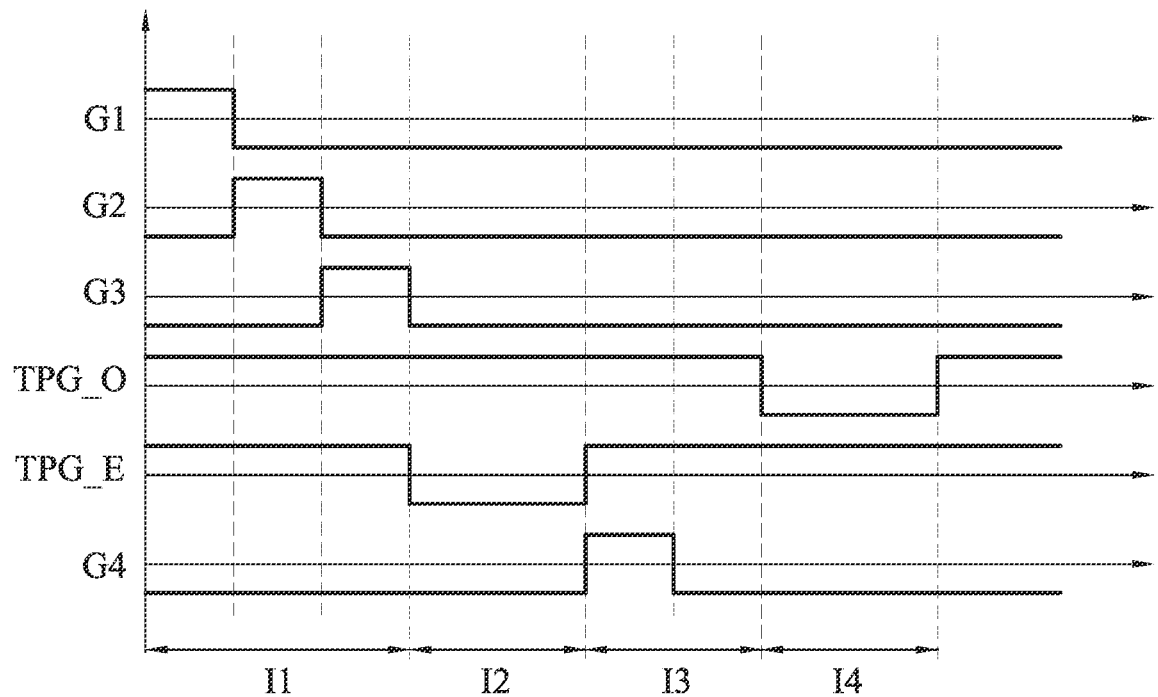
FIG. 3 depicts a signal timing diagram of a touch display device according to some embodiments of the present disclosure.

In some embodiments, in order to facilitate the understanding of an operation of the touch display device 100 of FIG. 1, please refer to FIG. 1 to FIG. 8. FIG. 3 depicts a signal timing diagram of a touch display device according to some embodiments of the present disclosure. FIG. 4 depicts a flow diagram of a driving method 300 according to some embodiments of the present disclosure. FIG. 5 to FIG. 8 depict a state diagram of part of the touch electrodes of a touch display device according to some embodiments of the present disclosure.

Figure 5:
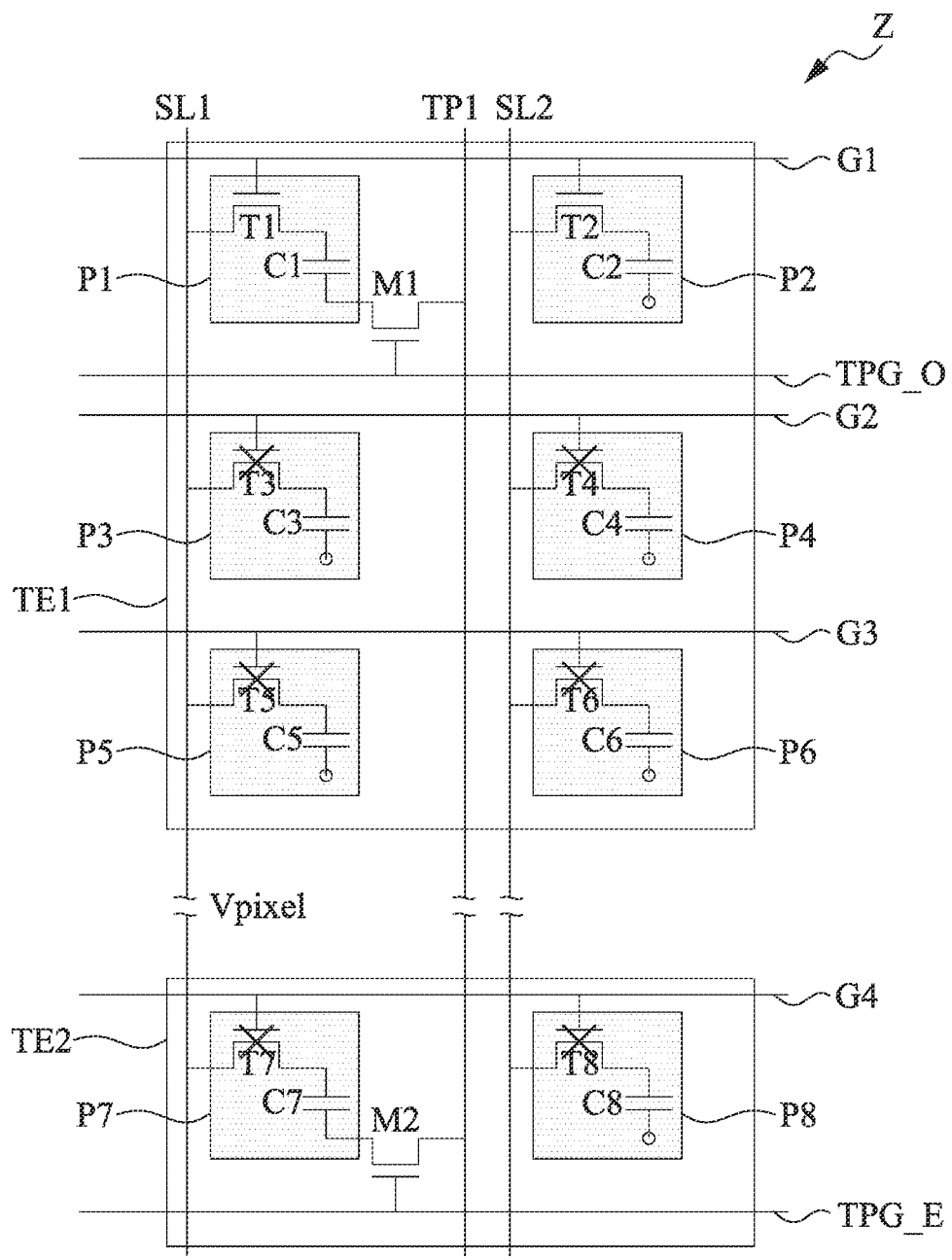
FIG. 5 depicts a state diagram of part of the touch electrodes of a touch display device according to some embodiments of the present disclosure.
Figure 6:
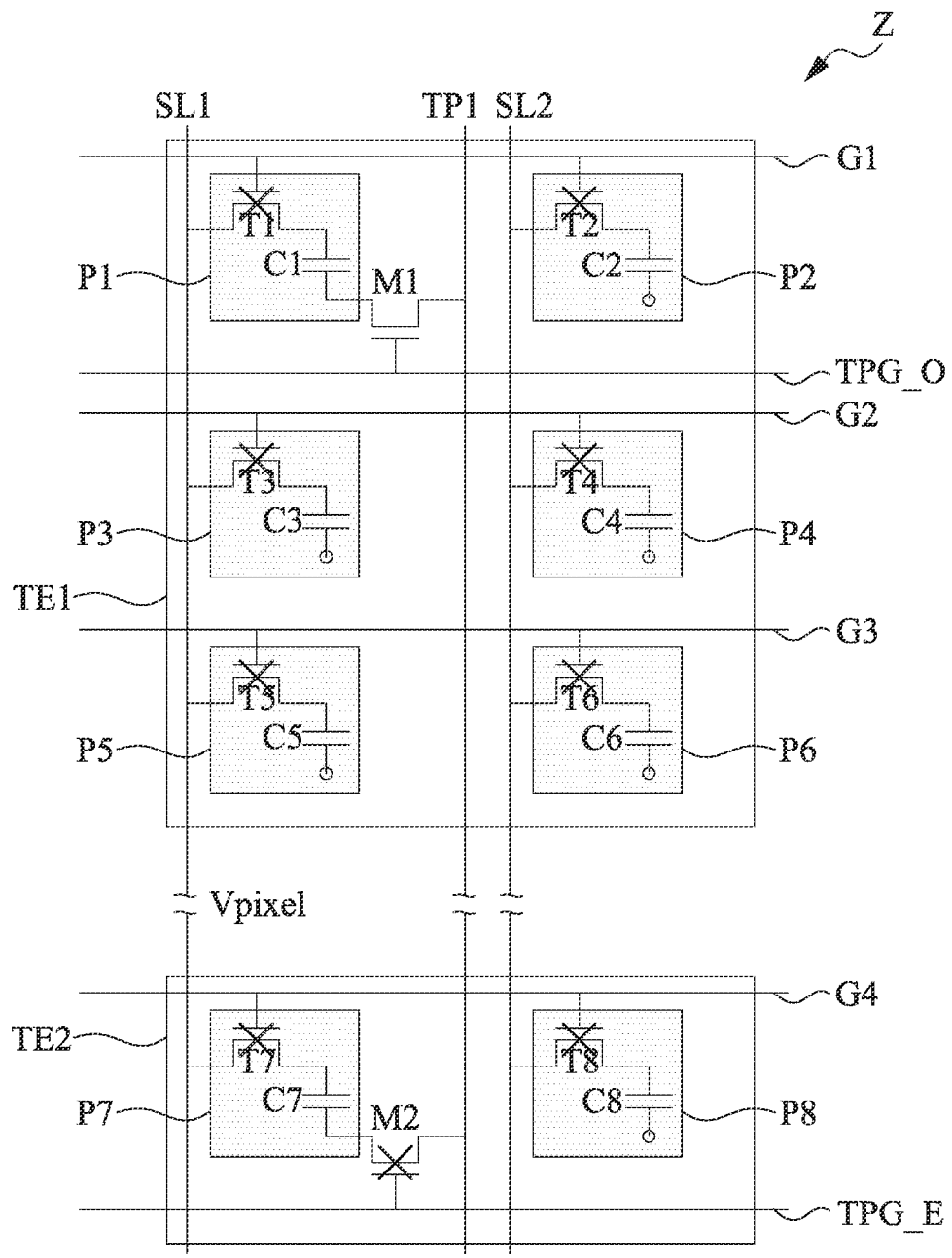
FIG. 6 depicts a state diagram of part of the touch electrodes of a touch display device according to some embodiments of the present disclosure.
Figure 7:
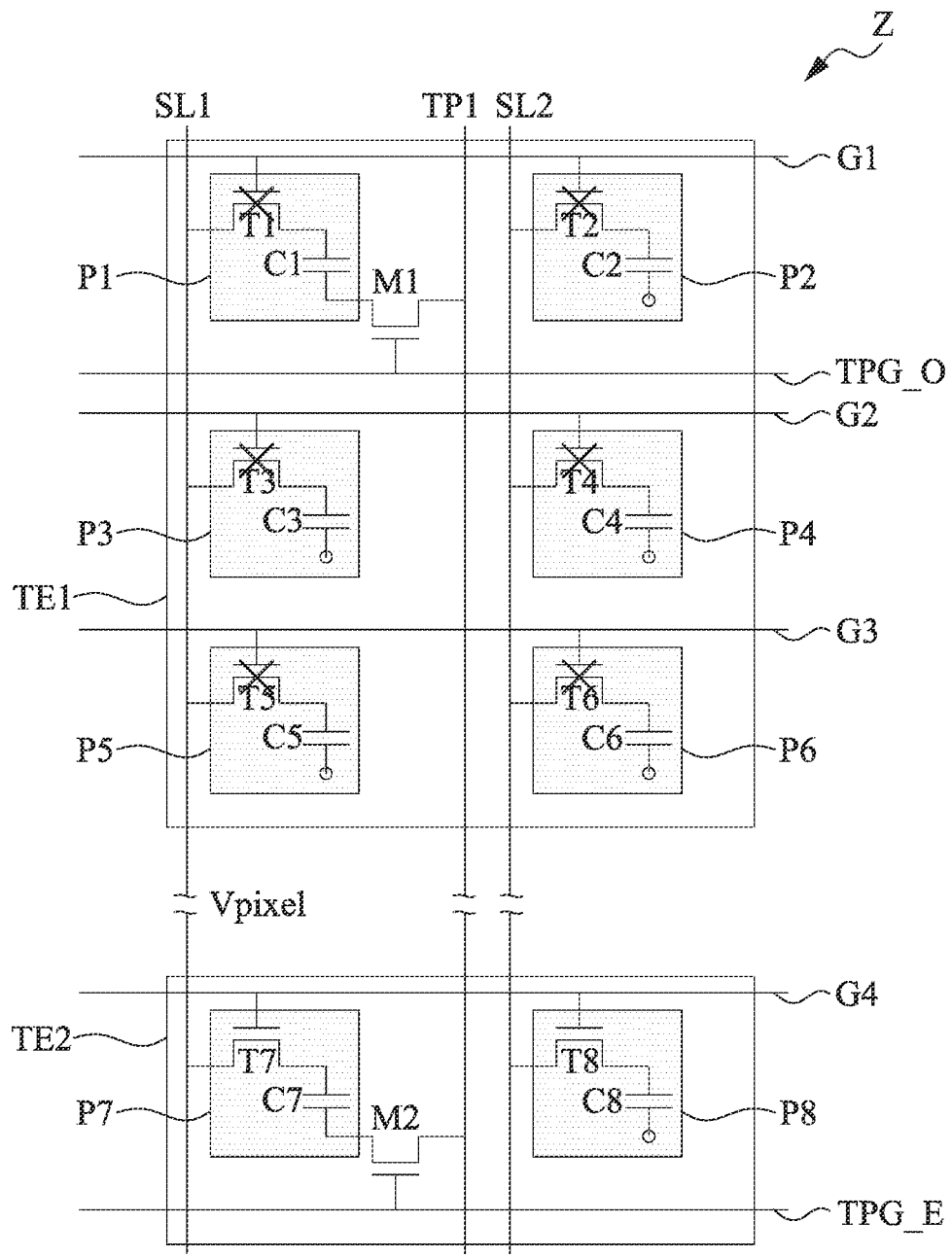
FIG. 7 depicts a state diagram of part of the touch electrodes of a touch display device according to some embodiments of the present disclosure.
Figure 8:
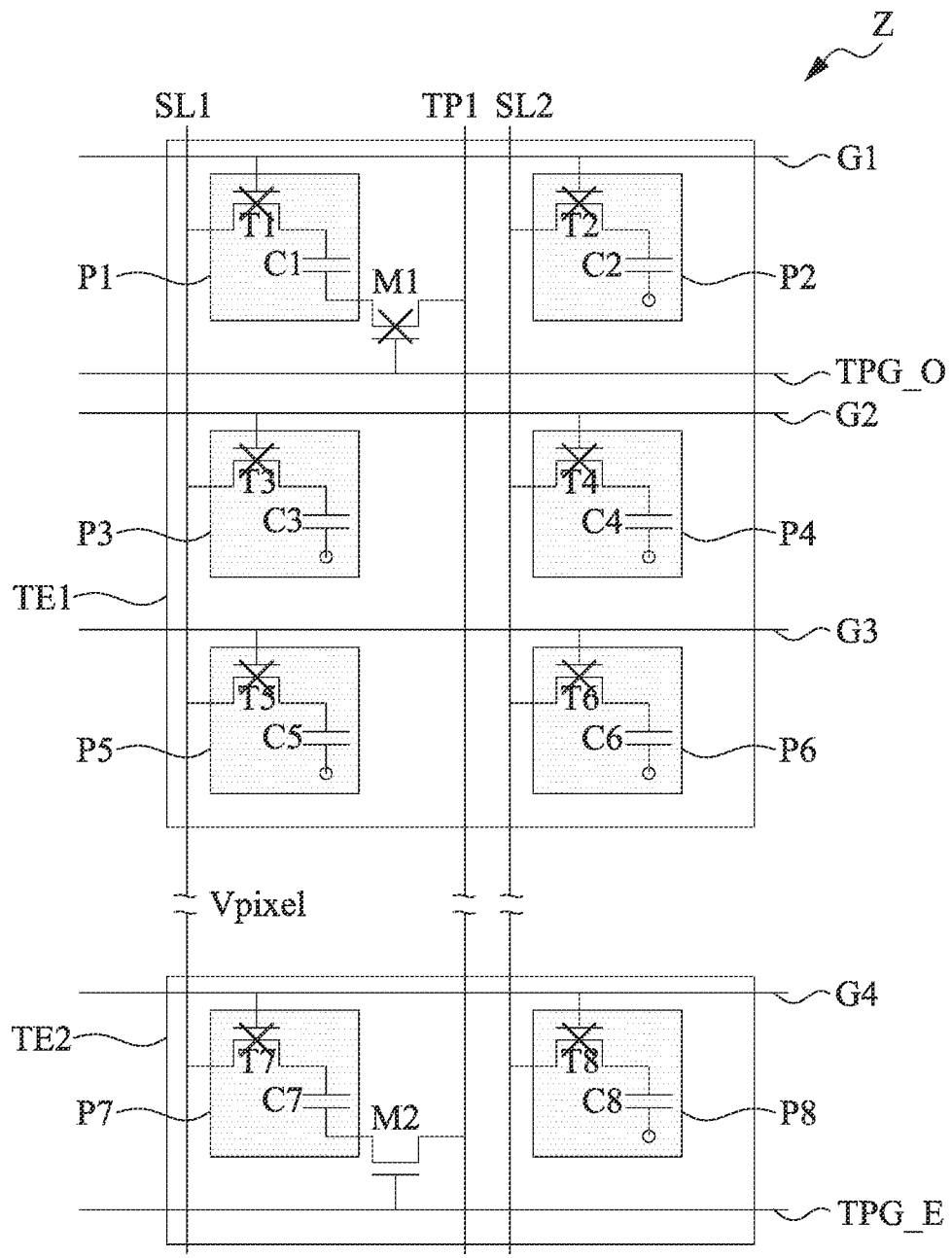
FIG. 8 depicts a state diagram of part of the touch electrodes of a touch display device according to some embodiments of the present disclosure.

In some embodiments, please refer to FIG. 3 and FIG. 5, the first gate signal transmitted by the first gate line G1 is at a high level at the first stage 11. The first control signal transmitted by the first control line TPG_O is at a high level. The second control signal transmitted by the second control line TPG_E is at a high level.

The first touch transistor M1 of the first touch electrode TE1 is turned on in response to the first control signal. The second touch transistor M2 of the second touch electrode TE2 is turned on in response to the second control signal.

Then, the first transistor T1 of the pixel circuit P1 and the second transistor T2 of the pixel circuit P2 are turned on in response to the first gate signal so as to display. The first data line SL1 and the second data line SL2 are configured to transmit a voltage Vpixel respectively.

When the second gate signal transmitted by the second gate line G2 is at a high level at the first stage 11, the third transistor T3 of the pixel circuit P3 and the fourth transistor T4 of the pixel circuit P4 are turned on in response to the high level of the second gate signal so as to display.

When the third gate signal transmitted by the third gate line G3 is at a high level at the first stage 11, the fifth transistor T5 of the pixel circuit P5 and the sixth transistor T6 of the pixel circuit P6 are turned on in response to the high level of the third gate signal so as to display.

It should be note that the first stage 11 is a display stage of the touch display device 100. The plurality of integrated circuits IC of the touch display device 100 of FIG. 1 transmit gate signals sequentially from top to bottom through a plurality of gate lines at the first stage 11 to control the first touch electrode TE1, and transmit the common electrode signal to the first touch electrode TE1 and the second touch electrode TE2 through the first touch signal line TP1. In other words, at the first stage 11, the plurality of integrated circuits IC of the touch display device 100 are configured to transmit the common electrode signal to a plurality of electrodes.

In step 310, a first touch signal of the first touch electrode of the first area is transmitted by the first touch signal line at a first stage.

In some embodiments, please refer to FIG. 1, FIG. 3, FIG. 4, and FIG. 6, at the second stage 12, the first control signal transmitted by the first control line TPG_O is at a high level. The second control signal transmitted by the second control line TPG_E is at a low level.

The first touch transistor M1 of the first touch electrode TE1 located in the first area A1 is kept turned on in response to the high level of the first control signal. The second touch transistor M2 of the second touch electrode TE2 located in the second area A2 is turned off in response to the low level of the second control signal.

Then, the first touch signal line TP1 is configured to transmit the first touch signal of the first touch electrode TE1 of the first area A1 to bottom integrated circuits IC of the touch display device 100.

Similarly, the third touch electrode TE3 located in the third area A3 and the fifth touch electrode TE5 located in the fifth area A5 are turned on in response to the first control signal. The second touch signal line TP2 is configured to transmit a touch signal of the third touch electrode TE3 of the third area A3 to bottom integrated circuits IC. The third touch signal line TP3 is configured to transmit a touch signal of the fifth touch electrode TE5 of the fifth area A5 to the bottom integrated circuits IC.

It should be noted that the second stage 12 is also a touch stage of the touch display device 100.

In step 320, a common electrode signal is transmitted by the first touch signal line at a second stage.

In some embodiments, please refer to FIG. 1, FIG. 3, FIG. 4, and FIG. 7, at the third stage 13, a fourth gate signal transmitted by the fourth gate line G4 is at a high level at the third stage 13. The first control signal transmitted by the first control line TPG_O is at a high level. The second control signal transmitted by the second control line TPG_E is at a high level.

The first touch transistor M1 of the first touch electrode TE1 is turned on in response to the high level of the first control signal. The second touch transistor M2 of the second touch electrode TE2 is turned on in response to the high level of the second control signal.

Then, the seventh transistor T7 of the pixel circuit P7 and the eighth transistor T8 of the pixel circuit P8 are turned on in response to the high level of the fourth gate signal so as to display.

It should be noted that the third stage 13 is a display stage of the touch display device 100. At the third stage 13, the plurality of integrated circuits IC of the touch display device 100 are configured to transmit common electrode signal to the a plurality of touch electrodes (e.g., the first touch electrode TE1 to the sixth touch electrode TE6) through the plurality of touch signal lines (e.g., the first touch signal line TP1 to the third touch signal line TP3).

In step 330, a second touch signal of the second touch electrode of the second area is transmitted by the first touch signal line at a third stage.

In some embodiments, please refer to FIG. 1, FIG. 3, FIG. 4, and FIG. 8, at a fourth stage 14, the first control signal transmitted by the first control line TPG_O is at a low level. The second control signal transmitted by the second control line TPG_E is at a high level.

The first touch transistor M1 of the first touch electrode TE1 located in the first area A1 is turned off in response to the low level of the first control signal. The second touch transistor M2 of the second touch electrode TE2 located in the second area A2 is kept turned on in response to the high level of the second control signal.

Then, the first touch signal line TP1 is configured to transmit the second touch signal of the second touch electrode TE2 of the second area A2 to the bottom integrated circuits IC of the touch display device 100.

Similarly, the fourth touch electrode TE4 located in the fourth area A4 and the sixth touch electrode TE6 located in the sixth area A6 are turned on in response to the high level of the second control signal. The second touch signal line TP2 is configured to transmit the touch signal of the fourth touch electrode TE4 of the fourth area A4 to bottom integrated circuits IC. The third touch signal line TP3 is configured to transmit the touch signal of the sixth touch electrode TE6 of the sixth area A6 to bottom integrated circuits IC.

It should be noted that the fourth stage 14 is a touch stage of the touch display device 100.

In some embodiments, a design of touch lines and touch electrodes of the touch display device 100 in FIG. 1 can reduce a number of touch lines by half compared with conventional technology.

For example, a resolution of conventional touch display device is divided into Full High Definition (FHD) of high-Definition resolution, Quarter High Definition (QHD) of 2K resolution, and Ultra High Definition (UHD) of 4K resolution or higher according to different sizes of conventional touch display device. If conventional touch display device has a sensing function of finger touch, a number of touch lines of a touch display device with different resolution is 5760. By adopting a design of touch lines and touch electrodes of the present disclosure, a number of touch lines of a touch display device can be reduced to 2880.

If conventional touch display device has a sensing function of stylus touch, a number of touch lines of a touch display device with different resolution is 11520. By adopting a design of touch lines and touch electrodes of the present disclosure, a number of touch lines of a touch display device can be reduced to 5760.

Based on the above embodiments, the present disclosure provides a touch display device and a driving method to reduce a number of touch lines of a touch display device so as to a risk of touch lines failure during the bonding process due to a resolution enhancement of a touch display device through a structure of touch lines coupled to touch electrodes in different areas and a method for time-division driving of touch electrodes in different areas.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A touch display device, comprising:
a first touch electrode, located in a first area of the touch display device, and configured to receive a first control signal so as to generate a first touch signal;
a second touch electrode, located in a second area of the touch display device, and configured to receive a second control signal so as to generate a second touch signal, wherein the first area is adjacent to the second area without overlapping;
a first touch transistor, configured to transmit the first touch signal of the first area, wherein a location of the first touch transistor overlaps a location of the first touch electrode;
a first touch signal line, coupled to the first touch electrode and the second touch electrode, wherein the first touch signal line is configured to transmit the first touch signal of the first area at a first stage, the first touch signal line is configured to transmit a common electrode signal at a second stage, and the first touch signal line is configured to transmit the second touch signal of the second area at a third stage;
a second touch signal line; and
third touch electrode, coupled to the second touch signal line, and located in a third area of the touch display device, wherein the third touch electrode comprises at least one hole, wherein the first touch signal line passes through the at least one hole of the third touch electrode.

2. The touch display device of claim 1, further comprising:
a first control line, coupled to the first touch electrode, and configured to transmit the first control signal; and
a second control line, coupled to the second touch electrode, and configured to transmit the second control signal.

3. The touch display device of claim 2, further comprising:
a plurality of first pixel circuits, configured to drive according to a first gate signal of a first gate line at the second stage so as to display.

4. The touch display device of claim 3, wherein the first touch transistor comprises:
a first end, coupled to the first touch signal line;
a second end, coupled to one of the plurality of first pixel circuits; and
a control end, coupled to the first control line;
wherein the first touch transistor is configured to transmit the first touch signal of the first area in response to the first control signal at the first stage.

5. The touch display device of claim 4, wherein the first touch transistor is coupled to a capacitor of one of the plurality of first pixel circuits.

6. The touch display device of claim 4, further comprising:

a plurality of second pixel circuits, configured to drive according to a second gate signal of a second gate line at a fourth stage so as to display.

7. The touch display device of claim 6, further comprising:
a second touch transistor, comprising:
a first end, coupled to the first touch signal line;
a second end, coupled to one of the plurality of second pixel circuits; and
a control end, coupled to the second control line;
wherein the second touch transistor is configured to transmit the second touch signal of the second area in response to the second control signal at the third stage.

8. The touch display device of claim 7, wherein the second touch transistor is coupled to a capacitor of one of the plurality of second pixel circuits.

9. The touch display device of claim 7, wherein the first touch signal line and the first control line overlap in a vertical projection direction, wherein the first touch signal line and the second control line overlap in the vertical projection direction.

10. The touch display device of claim 9, wherein the first control line, the second control line, the first gate line, and the second gate line are parallel to each other.

11. The touch display device of claim 10, wherein the first touch electrode and the plurality of first pixel circuits are located in different layers, wherein the second touch electrode and the plurality of second pixel circuits are located in different layers.

12. The touch display device of claim 11, further comprising:
a plurality of data lines, coupled to the plurality of first pixel circuits and the plurality of second pixel circuits, wherein the plurality of data lines and the first touch signal line are parallel to each other.

13. The touch display device of claim 12, wherein the first touch signal line does not cross the plurality of data lines.

14. The touch display device of claim 13, wherein the first touch transistor and the second touch transistor coupled to the first touch signal line are located in a same row or a same column.

15. The touch display device of claim 1, wherein the first touch signal line and the second touch signal line are parallel to each other.

16. A driving method, comprising:
transmitting a first touch signal of a first touch electrode of a first area of a touch display device by a first touch signal line and a first touch transistor of the touch display device at a first stage, wherein the first touch signal line is coupled to the first touch electrode and the first touch transistor, wherein a location of the first touch transistor overlaps a location of the first touch electrode;
transmitting a common electrode signal by the first touch signal line at a second stage; and
transmitting a second touch signal of a second touch electrode of a second area of the touch display device by the first touch signal line at a third stage, wherein the first area is adjacent to the second area without overlapping, wherein the first touch signal line is also coupled to the second touch electrode, wherein the first touch signal is different from the second touch signal, wherein transmitting the first touch signal of the first touch electrode of the first area of the touch display device by the first touch signal line and the first touch transistor of the touch display device at the first stage comprises:

transmitting a third touch signal of a third touch electrode of a third area of the touch display device by a second touch signal line at the first stage, wherein the third touch electrode is coupled to the second touch signal line, wherein the first touch signal line and the second touch signal line are parallel to each other, wherein the third touch electrode comprises at least one hole, wherein the first touch signal of the first touch electrode of the first area is transmitted via the first touch signal line passing through the at east one hole of the third touch electrode.

* * * * *